United States Patent
Lanfer et al.

(10) Patent No.: US 12,444,123 B2
(45) Date of Patent: Oct. 14, 2025

(54) METHOD OF USING A BI-DIRECTIONAL TEXTURE FUNCTION

(71) Applicant: BASF COATINGS GMBH, Münster (DE)

(72) Inventors: Benjamin Lanfer, Münster (DE); Philipp Reisloh, Münster (DE); Mark Gutjahr, Münster (DE); Florina Trost, Münster (DE); Weiran Lu, Münster (DE); Jens Wegner, Münster (DE)

(73) Assignee: BASF COATINGS GMBH, Muenster (DE)

( * ) Notice: Subject to any disclaimer, the term of this patent is extended or adjusted under 35 U.S.C. 154(b) by 126 days.

(21) Appl. No.: 18/003,461

(22) PCT Filed: Jun. 21, 2021

(86) PCT No.: PCT/EP2021/066887
§ 371 (c)(1),
(2) Date: Dec. 27, 2022

(87) PCT Pub. No.: WO2022/002676
PCT Pub. Date: Jan. 6, 2022

(65) Prior Publication Data
US 2023/0316627 A1 Oct. 5, 2023

(30) Foreign Application Priority Data

Jun. 29, 2020 (EP) .................................. 20182808

(51) Int. Cl.
*G06T 15/04* (2011.01)
*G06T 15/50* (2011.01)
(52) U.S. Cl.
CPC ............ *G06T 15/04* (2013.01); *G06T 15/506* (2013.01)
(58) Field of Classification Search
None
See application file for complete search history.

(56) References Cited

U.S. PATENT DOCUMENTS 8,872,811 B1   10/2014   Martin et al.
2008/0158239 A1*  7/2008  Lamy ...................... G06T 15/50
                                                           345/581

FOREIGN PATENT DOCUMENTS

WO    2020200982 A1    10/2020

OTHER PUBLICATIONS

International Search Report and Written Opinion for corresponding PCT/EP2021/066887 mailed Sep. 10, 2021; 10 pages.
Golla et al, "Interactive Interpolation of Metallic Effect Car Paints", DOI: 10.2312/vmv.20181248 external link Oct. 31, 2018 (Oct. 31, 2018), page Modeling and Visualization, URL:https://diglib.eg.org/bitstream/handle/10.2312/vmv20181248/011-020.pdf.
Rump et al, "Efficient Resampling, Compression and Rendering of Metallic and Pearlescent Paint", Jan. 2009 (Jan. 2009), p. 11-18; URL:http://cg.cs.uni-bonn.de/aigaion2root/attachments/rump-vmv-09.pdf.
Dana et al, "Reflectance and texture of real-world surfaces", ACM Transactions on Graphics, ACM, NY, US, vol. 18, No. 1, Jan. 1999 (Jan. 1999), p. 1-34.
Golla et al., "An Efficient Statistical Data Representation for Real-Time Rendering of Metallic Effect Car Paints", J. Barbic et al. (Eds.): EuroVR 2017, LNCS 10700, pp. 51-68 (2017).
Rump et al., "Photo-realistic Rendering of Metallic Car Paint from Image-Based Measurements", Eurographics, vol. 27, No. 2, pp. 527-536 (2008).

* cited by examiner

*Primary Examiner* — Yanna Wu
(74) *Attorney, Agent, or Firm* — Armstrong Teasdale LLP

(57) ABSTRACT

Described herein is a method of using a bi-directional texture function (BTF) of an object in design and development of automobiles and other everyday objects. Also described herein is a computer system that uses a BTF of an object to generate a representation of the object which accurately reproduces a visual appearance of the object at a given illumination of the object, where the representation is generated using a render engine.

14 Claims, No Drawings

METHOD OF USING A BI-DIRECTIONAL TEXTURE FUNCTION

CROSS-REFERENCE TO RELATED APPLICATIONS

This application is a U.S. National Phase Application of PCT/EP2021/066887, filed Jun. 21, 2021, which claims the benefit of priority to European Patent Application No. 20182808.4, filed Jun. 29, 2020, the entire contents of which are hereby incorporated by reference herein.

FIELD OF THE INVENTION

The present disclosure relates to the use of a bi-directional texture function (BTF) of an object, particularly of a physical car paint sample, in the design and development of automobiles and other everyday objects. The present disclosure also refers to a respective computer system.

BACKGROUND

Current car paint color design processes are based on physical samples of a car paint applied to most often small flat panels. Working only with physical samples has several drawbacks. Painting the samples is costly and takes time.

In addition, due to cost only small flat panels are painted and it can be difficult to infer from the small samples how a coating would look like on a different three-dimensional shape, for example, a car body, or in a different light setting. Car paints are often chosen as effect colors with gonioapparent effects, particularly caused by interference and/or metallic pigments, such as metallic flake pigments or special effect flake pigments, such as, pearlescent flake pigments.

Using a digital model of an appearance of the car paint it is possible to computer-generate images of the car paint applied to an arbitrary shape in arbitrary light conditions. A bidirectional texture function (BTF) represents such a digital model that can capture also a spatially varying appearance of a car paint, such as sparkling. Based on computer-generated images of the car paint applied to an object it is possible to virtually assess characteristics of a color of the car paint.

The BTF is a representation of the appearance of texture as a function of viewing and illumination direction, i.e. viewing and illumination angle. It is an image-based representation, since the geometry of the surface of the object to be considered is unknown and not measured. BTF is typically captured by imaging the surface at a sampling of the hemisphere of possible viewing and illumination directions. BTF measurements are collections of images. The BTF is a 6-dimensional function. (Dana, Kristin J., Bram van Ginneken, Shree K. Nayar, and Jan J. Koenderink. 'Reflectance and Texture of Real-World Surfaces'. *ACM Transactions on Graphics* 18, no. 1 (1 Jan. 1999): 1-34. https://doi.org/10.1145/300776.300778.)

Golla, Tim et al.: "An Efficient Statistical Data Representation for Real-Time Rendering of Metallic Effect Car Paints", in J. Barbic et al. (Eds.): EuroVR, LNCS 10700, pp. 51-68, 2017 discloses a representation for metallic car paints which is based on computing the statistical properties of measured real-world samples and is suited for real-time rendering. The representation enables the generation of BTFs of arbitrary resolution.

Rump, Martin et al.: "Photo-realistic Rendering of Metallic Car Paint from Image-Based Measurements", Computer Graphics Forum, Vol. 27, pp. 527-536, Wiley Online Library (2008) discloses a measurement and rendering framework especially designed for metallic car paint and based on BTF measurements. Rendering is performed using BRDF and BTF rendering techniques.

SUMMARY

The present disclosure relates to the use of a bi-directional texture function (BTF) of an object, particularly of a physical car paint sample, in the design and development of automobiles and other everyday objects.

Uses of a bi-directional texture function of an object, methods, and computer systems for using the bi-directional texture function with the features of the independent claims are provided, respectively. Further features and embodiments of the claimed use, method and systems are described in the dependent claims and in the description.

According to the present disclosure, a bi-directional texture function (BTF) of a material, e.g., a car paint, is used to render a representation of the object which accurately reproduces the optical appearance of the object, in particular, the colors and color effects, at a given illumination of the object.

In the context of the present disclosure, the term "render" is used to describe the automatic process of generating a photorealistic image of an object by means of a computer program.

In order to reflect the texture of the object correctly, the BTF comprises the table of spatial texture images depending on illumination and observation angle and direction.

In one embodiment, a BTF is used in OEM (original equipment manufacturer) vehicle part design to design a vehicle part which matches the optical appearance of the part(s) adjacent to it in the finished vehicle and to avoid unsolvable color-matching issues, e.g., between a front apron and an engine hood of the vehicle. The BTF allows for accurately reproducing the optical appearance of the finished vehicle.

In another embodiment, a BTF is used in automotive color design to simulate the optical appearance of a finished vehicle including the complex color appearance and optical effects on the finished vehicle; thereby facilitating development of colors which best fit the complex shape of the vehicle body and shortening development time.

A representation of a vehicle obtained using a BTF can also be used to simulate and visualize colors, particularly effect coatings, on a vehicle in the context of a car configurator. This helps customers to perceive the difference between colors in the same color group, e.g., between ordinary and premium colors and interference colors (IC). The representation obtained using a BTF also allows for a photorealistic visualization of a vehicle in the context of a car sales platform, including color and effects.

The objects rendered using a BTF function are not restricted to vehicles or vehicle parts. The representations also can be used in other areas, e.g., gaming, furniture, clothing, packaging materials, etc.

In an exemplary embodiment, a BTF is used in furniture design to design a piece of furniture. The BTF allows for accurately reproducing the optical appearance of the finished article including the complex color appearance and optical effects on the finished article.

In another exemplary embodiment, a BTF is used in clothing design to design a piece of clothing. The BTF allows for accurately reproducing the optical appearance of the finished piece of clothing including the complex color appearance and optical effects on the finished piece of clothing.

The present disclosure also provides a method for designing a vehicle part which matches the optical appearance of the part(s) adjacent to it in the finished vehicle, which involves simulating and visualizing the finished vehicle using a BTF.

The present disclosure also provides a method for developing an automotive coating, which involves simulating and visualizing the optical appearance of a finished vehicle using a BTF.

The present disclosure also provides a method for designing a piece of furniture, which involves simulating and visualizing the piece of furniture using a BTF.

The present disclosure also provides a method for designing a piece of clothing, which involves simulating and visualizing the piece of clothing using a BTF.

In the present disclosure, the BTF used is a special BTF, which is generated by a process comprising at least the following steps:
- measuring an initial BTF for the object using a camera-based measurement device,
- capturing spectral reflectance data for the object for a pre-given number, i.e. a limited number of different measurement geometries using a spectrophotometer,
- adapting the initial BTF to the captured spectral reflectance data, thus, gaining an optimized BTF.

To improve color accuracy it is proposed that, in a first step, an initial BTF of the object, particularly of a physical car paint sample is acquired using the camera-based measurement device. Then, in a second step, a second spectral measurement is performed on the same sample using a spectrophotometer, particularly a handheld spectrophotometer. Thus, additional, more accurate spectral reflectance data for a small number (e. g. <25) of measurement geometries are obtained. The initial BTF is then enhanced with the more accurate but sparse spectral reflectance data. The result is a BTF which captures the color and the spatially varying appearance, such as sparkling of the car paint sample and is sufficiently accurate.

According to one embodiment, the camera-based measurement device creates a plurality of images (photos) of the object/sample at different viewing angles, at different illumination angles, at different illumination colors and/or for different exposure times, thus providing a plurality of measurement data considering a plurality of combinations of illumination angle, viewing angle, illumination color and/or exposure time. The camera-based measurement device can be a commercially available measurement device, such as, for example, the X-Rite TAC7®. A small flat panel coated with the car paint sample and a clear-coat is inserted into the measurement device and the measurement process is started.

From the measurement and a subsequent post-processing the initial BTF is obtained.

In the course of the post-processing, the images/photos with different illumination color and different exposure time, but with equal illumination angle and viewing angle are combined into images with high dynamic range, respectively. Further, the perspective of the photos onto the sample is corrected. On the basis of the data gained by the photos and the post-processing, the parameters of the initial BTF are determined.

Adapting the initial BTF to the captured spectral reflectance data, thus, gaining an optimized BTF, comprises to segment the initial BTF into different terms, each term comprising a set of parameters. The parameters of each term can be optimized separately using the captured spectral reflectance data.

Thereby, the initial BTF is segmented (divided) into two main terms, a first term being a homogeneous bi-directional reflectance distribution function (BRDF) which describes reflectance properties of the object, e.g. the car paint sample, depending only on the measurement geometry, and a second term being a texture function which accounts for a spatially varying appearance of the object, i.e., which adds a view and illumination dependent texture image. The texture images stored in the model have the property that on average across all pixels the sum of the intensities in each of the RGB channels is zero. When viewed from afar the overall color impression of the car paint is determined not by the color at a single point but by the average color of a larger area. Due to the above-mentioned property it is assumed that the average color across a larger region of the texture image is zero or close to zero. This allows for overlaying the texture image without changing the overall color. This also means that the texture images can be ignored when optimizing the BTF.

For the representation of the BTF. the color model first introduced by Rump et al. (Rump, Martin, Ralf Sarlette, und Reinhard Klein. "Efficient Resampling, Compression and Rendering of Metallic and Pearlescent Paint." In Vision, Modeling, and Visualization, 11-18, 2009.), and also presented in Golla, Tim et al.: "An Efficient Statistical Data Representation for Real-Time Rendering of Metallic Effect Car Paints", in J. Barbic et al. (Eds.): EuroVR, LNCS 10700, pp. 51-68, 2017, is used:

$$f(x, \bar{i}, \bar{o}) = \chi(\bar{i}, \bar{o}) \left( \frac{a}{\pi} + \sum_{k=1}^{3} f^{CT}_{S_k, \alpha_k, F_{0,k}}(\bar{i}, \bar{o}) \right) + \Xi(x, \bar{i}, \bar{o}) \quad (1)$$

with
- x: Surface coordinates of the sample/object
- $\bar{i}, \bar{o}$: Illumination and observation/viewing directions at the basecoat of the sample
- $\chi(\bar{i}, \bar{o})$: Color table depending on illumination and observation direction
- $\alpha$: Albedo or diffuse reflectivity
- $f^{CT}_{S_k, \alpha_k, F_{0,k}}(\bar{i}, \bar{o})$: The k-th Cook-Torrance lobe; the Cook-Torrance lobe is a commonly used BRDF that describes the glossiness of a microfaceted surface
- $S_k$: Weight for the k-th Cook-Torrance lobe
- $\alpha_k$: Parameter for the Beckmann distribution of the k-th Cook-Torrance lobe
- $F_{0,k}$: Fresnel reflectivity for the k-th Cook-Torrance lobe
- $\Xi(x, \bar{i}, \bar{o})$: Table of spatial texture images depending on illumination and observation direction Generally, the bidirectional reflectance distribution function (BRDF) is a function of four real variables that defines how light is reflected at an opaque surface. The function takes an incoming light direction $\bar{i}$ and an outgoing direction $\bar{o}$ and returns the ratio of reflected radiance exiting along $\bar{o}$ to the irradiance incident on the surface from direction $\bar{i}$. BRDF means a collection of photometric data of any material (herein meaning the object, i.e. the paint sample) that will describe photometric reflective light scattering characteristics of the material (the object) as a function of illumination angle and reflective scattering angle. The BRDF describes the spectral and spatial reflective scattering properties of the object, particularly of a gonioapparent material comprised by the object, and provides a description of the appearance of the material and many other appearance attributes, such as gloss, haze, and color, can be easily derived from the BRDF.

Generally, the BRDF consists of three color coordinates as a function of scattering geometry. The specific illuminant and the color system (for example CIELAB) must be specified and included with any data when dealing with the BRDF.

As can be recognized from equation (1), the first term, i.e. the BRDF is divided into a first sub-term corresponding to a color table $\chi(\bar{l},\bar{o})$ and a second sub-term corresponding to an intensity function $$\left(\frac{a}{\pi} + \sum_{k=1}^{3} f^{CT}_{S_k,\alpha_k,F_{0,k}}(\bar{l},\bar{o})\right).$$

The Parameters of the initial BTF are optimized to minimize a color difference between the spectral reflectance data and the initial BTF by optimizing in a first optimization step the parameters of the color table while the parameters of the intensity function are kept constant, and by optimizing in a second optimization step the parameters of the intensity function while the parameters of the color table are kept constant.

The spectral reflectance data, i.e. the spectral reflectance curves are acquired only for a limited number of measurement geometries. Each such measurement geometry is defined by a specific illumination angle/direction and a specific viewing angle/direction. The spectral reflectance measurements are performed, for example, by a hand-held spectrophotometer, such as, for example, a Byk-Mac I® with six measurement geometries (a fixed illumination angle and viewing/measurement angles of −15°, 15°, 25°, 45°, 75°, 110°), an X-Rite MA-T12® with twelve measurement geometries (two illumination angles and six angles of measurement), or an X-Rite MA 98® (two illumination angles and up to eleven angles of measurement). The spectral reflectance data obtained from these measurement devices are more accurate than the color information obtained from the camera-based measurement device.

According to a further embodiment, for the optimization of the color table in the first optimization step for each spectral measurement geometry first CIEL*a*b* values are computed from the spectral reflectance data (curves) and second CIEL*a*b* values are computed from the initial BTF, and correction vectors in a* and b* coordinates are computed by subtracting the second CIEa*b* values from the first CIEa*b* values and the correction vectors are component-wise interpolated and extrapolated for the complete range of viewing and illumination angles stored in the color table, the interpolated correction vectors are applied to the initial BTF CIEL*a*b* values for each spectral measurement geometry stored in the color table and the corrected BTF CIEL*a*b* values are transformed to linear sRGB coordinates which are normalized (so that their sum is, for example, equal to 3) and finally stored in the color table.

A multilevel B-Spline interpolation algorithm (see Lee, Seungyong, George Wolberg, und Sung Yong Shin. "Scattered data interpolation with multilevel B-splines". IEEE transactions on visualization and computer graphics 3, Nr. 3 (1997): 228-244.) can be used for the component-wise interpolation and extrapolation of the correction vectors.

According to still a further embodiment, for optimization of the parameters of the intensity function in the second optimization step, a cost function is defined based on the sum of the color differences across all spectral reflectance measurements geometries. The cost function $C(\alpha, S, F_0, a)$ is defined across all reflectance measurement geometries according to the following equation:

$$C(\alpha,S,F_0,a)=\Sigma_{g \in G} \Delta E(f(x,\bar{l},\bar{o})F_{CC}(i,o),f_{Ref}(\bar{l},\bar{o}))+P(\alpha,S,F_0,\alpha) \quad (2)$$

with
- G: The set of measurement geometries for which spectral reflectance data is available
- g: One out of the set of measurement geometries
- $\Delta E(f_{Test}, f_{Ref})$: A weighted color difference formula measuring the difference between the colors $f_{Test}$ and $f_{Ref}$
- $f_{Ref}(\bar{l},\bar{o})$: Reference color derived from spectral measurement
- $f_{Test}=f(x, \bar{l},\bar{o})\cdot F_{CC}(i, o)$: Test color computed from the initial BTF for the given illumination and observation direction
- $\alpha=(\alpha_1, \alpha_2, \alpha_3)$: Vector of parameters for the Beckmann distribution of the three Cook-Torrance lobes
- $S=(S_1, S_2, S_3)$: Vector of weights for the three Cook-Torrance lobes
- $F_0=(F_{0,1}, F_{0,2}, F_{0,3})$: Vector of Fresnel reflections for the three Cook-Torrance lobes
- $P(\alpha, S, F_0, \alpha)$: Penalty function As indicated in equation (2) the cost function can be supplemented by a penalty function which is designed to take specific constraints into account, such constraints preferably comprise to keep the parameter values in a valid range.

To compute the color difference, the initial BTF is evaluated at the different spectral reflectance measurement geometries and the resulting CIEL*a*b* values are compared to the CIEL*a*b* values from the spectral reflectance measurements using a weighted color difference formula such as, for example, the formula defined in DIN6157/2, and the parameters of the intensity function are optimized using a non-linear optimization method, such as, for example the Nelder-Mead-Downhill-Simplex method, so that the cost function is minimized.

When optimizing the color table, for each spectral reflectance measurement geometry of the spectrophotometer a correction vector is determined. The correction vector results as a difference of the reflected radiance in the RGB channels from the BRDF part of the initial BTF and the spectral reflectance data for the same geometry, respectively. The computation of the correction vectors is performed in the CIEL*a*b* color space. The resulting correction vectors are interpolated component-wise over the entire parameter range of the color table.

According to still a further embodiment, the first and the second optimization steps are run repeatedly/iteratively to further improve an accuracy of the optimized BTF. The number of iterations can be specified and pre-defined. It has been found that three iterations can already yield reliable good results.

It has been found that the optimized BTF is more accurate than the initial BTF which is obtained directly from the camera-based device. This is the case not only for the few (limited number of) spectral reflectance geometries where additional spectral reflectance data are provided, but for the complete range of illumination and viewing directions.

The bi-directional texture function (BTF) of an object can be generated using a system comprising:
- a camera-based measurement device which is configured to measure an initial BTF for the object,
- a spectrophotometer which is configured to capture spectral reflectance data for the object for a pre-given number of different measurement geometries, a computing device which is in communicative connection with the camera-based measurement device and with the spectrophotometer, respectively, and which is configured to receive via the respective communicative connection the initial BTF and the captured spectral reflectance data for the object, and to adapt the initial BTF to the captured reflectance data, thus gaining an optimized BTF.

The system may further comprise a database which is configured to store the initial BTF, the spectral reflectance data for the object for the pre-given number of different measurement geometries and the optimized BTF. The computing device may be in communicative connection with the database in order to retrieve the initial BTF and the spectral reflectance data for the object for the pre-given number of different measurement geometries and to store the optimized BTF. That means that the initial BTF gained from the camera-based measurement device and the spectral reflectance data captured by the spectrophotometer may be first stored in the database before the computing device retrieves the initial BTF and the spectral reflectance data in order to adapt the initial BTF to the captured reflectance data, thus gaining the optimized BTF. In this scenario, the camera-based measurement device and the spectrophotometer are also in communicative connection with the database. Thus, both the communicative connection between the computing device and the camera-based measurement device and the communicative connection between the computing device and the spectrophotometer may be a direct connection or an indirect connection via the database, respectively. Each communicative connection may be a wired or a wireless connection. Each suitable communication technology may be used. The computing device, the camera-based measurement device and the spectrophotometer, each may include one or more communications interface for communicating with each other. Such communication may be executed using a wired data transmission protocol, such as fiber distributed data interface (FDDI), digital subscriber line (DSL), Ethernet, asynchronous transfer mode (ATM), or any other wired transmission protocol. Alternatively, the communication may be wirelessly via wireless communication networks using any of a variety of protocols, such as General Packet Radio Service (GPRS), Universal Mobile Telecommunications System (UMTS), Code Division Multiple Access (CDMA), Long Term Evolution (LTE), wireless Universal Serial Bus (USB), and/or any other wireless protocol. The respective communication may be a combination of a wireless and a wired communication.

The computing device may include or may be in communication with one or more input units, such as a touch screen, an audio input, a movement input, a mouse, a keypad input and/or the like. Further the computing device may include or may be in communication with one or more output units, such as an audio output, a video output, screen/display output, and/or the like.

The present disclosure also relates to a computer system comprising:
  a computer unit;
  a computer readable program with program code stored in a non-transitory computer-readable storage medium, the program code causing the computer unit, when the program is executed on the computer unit,
    to use a bi-directional texture function (BTF) of an object to generate a representation of the object which accurately reproduces the optical appearance of the object,
      the representation being generated using a render engine.

In one embodiment, the representation of the object is generated using a 3D render engine.

In a further embodiment, the representation of the object is generated using a real-time render engine. A 3D-(real-time) render engine simulates the light propagation within a virtual 3D light scene under consideration of the optical (reflection) properties of the materials present in the scene. A mathematical graphics model describes the optical properties of the material.

In one embodiment, the computer system comprises a specific program, called shader, for interpreting the BTF. In a further embodiment, the system comprises an importer and a shader for the render engine.

An importer is a software application that reads a data file or metadata information in one format and converts it to another format via special algorithms (such as filters). An importer often is not an entire program by itself, but an extension to another program, implemented as a plug-in. When implemented in this way, the importer reads the data from the file and converts it into the hosting application's native format. The role of the importer is to read the information on the BTF from a file and feed it to the shader. If the shader uses a limited BTF model, then the importer has to translate the parameters of the full BTF model to the limited model. This is done by optimizing the parameters of the limited model so that the reflectivity for a set of measurement geometries is as similar as possible to the reflectivity of the full BTF model. In one embodiment of the computer system, the importer is configured to read the BTF from a file and translate the parameters of the BTF to the parameters of the texture function used by the shader The importer reads the information from the BTF and provides it to the specific shader for the render engine. If the shader cannot interpret the full graphics model incorporated in the BTF and uses a simplified model, translation of the information in the BTF by the importer is necessary.

A shader is a type of computer program originally used for shading in 3D scenes (the production of appropriate levels of light, darkness, and color in a rendered image), but now performs a variety of specialized functions in various fields within the category of computer graphics special effects. Beyond simple lighting models, more complex uses of shaders include: altering the hue, saturation, brightness (HSL/HSV) or contrast of an image; producing blur, light bloom, volumetric lighting, normal mapping (for depth effects), bokeh, cel shading, posterization, bump mapping, distortion, chroma keying (for so-called "bluescreen/greenscreen" effects), edge and motion detection, as well as psychedelic effects.

Shaders describe the traits of either a vertex or a pixel. Vertex shaders describe the attributes (position, texture coordinates, colors, etc.) of a vertex, while pixel shaders describe the traits (color, z-depth and alpha value) of a pixel. A vertex shader is called for each vertex in a primitive (possibly after tessellation); thus one vertex in, one (updated) vertex out. Each vertex is then rendered as a series of pixels onto a surface (block of memory) that will eventually be sent to the screen.

In the context of the present disclosure, a fragment shader is mainly used. Special code for a vertex shader is only needed as the vertex shader has to prepare some input data for the fragment shader.

Fragment shaders compute color and other attributes of each "fragment": a unit of rendering work affecting at most a single output pixel. The simplest kinds of fragment shaders output one screen pixel as a color value; more complex shaders with multiple inputs/outputs are also possible. Fragment shaders range from simply always outputting the same color, to applying a lighting value, to doing bump mapping, shadows, specular highlights, translucency and other phenomena. They can alter the depth of the fragment (for Z-buffering), or output more than one color if multiple render targets are active.

Vertex shaders are run once for each vertex given to the graphics processor. The purpose is to transform each vertex's 3D position in virtual space to the 2D coordinate at which it appears on the screen (as well as a depth value for the Z-buffer). Vertex shaders can manipulate properties such as position, color and texture coordinates, but cannot create new vertices.

In one embodiment, the computer system provides a plug-in for at least one rendering software application such as V-ray or LuxCoreRender, and/or at least one game engine, such as Unreal Engine or Unity.

In one embodiment, the computer system provides a plug-in for Unity. Unity is a cross-platform game engine developed by Unity Technologies. The engine can be used to create three-dimensional, two-dimensional, virtual reality, and augmented reality games, as well as simulations and other experiences. The engine has been adopted by industries outside video gaming, such as film, automotive, architecture, engineering and construction.

The computer system may include or may be in communication with one or more output units, such as a video output, screen/display output, an artificial reality (AR) or virtual reality (VR) output and/or the like.

Embodiments of the invention may be used with or incorporated in a computer system that may be a standalone unit or include one or more remote terminals or devices in communication with a central computer, located, for example, in a cloud, via a network such as, for example, the Internet or an intranet. As such, the computing device described herein and related components may be a portion of a local computer system or a remote computer or an online system or a combination thereof. The database and software described herein may be stored in computer internal memory or in a non-transitory computer readable medium.

Further aspects of the invention will be realized and attained by means of the elements and combinations particularly depicted in the appended claims. It is to be understood that the description is exemplary and explanatory only and does not restrict the invention as described.

The invention claimed is:

1. A method of using a bi-directional texture function (BTF) to simulate an object, the method comprising:
generating an optimized BTF by:
measuring an initial BTF for the object using a camera-based measurement device;
capturing spectral reflectance data for the object for a pre-given number of different measurement geometries using a spectrophotometer; and
adapting the initial BTF of formula (1) by segmenting $$f(x, \bar{i}, \bar{o}) = \chi(\bar{i}, \bar{o})\left(\frac{a}{\pi} + \sum_{k=1}^{3} f^{CT}_{S_k, a_k, F_{0,k}}(\bar{i}, \bar{o})\right) + \Xi(x, \bar{i}, \bar{o}) \quad (1)$$

with
x: surface coordinates of the sample/object,
$\bar{i}, \bar{o}$: illumination and observation/viewing directions at a basecoat of the sample, $\chi(\bar{i},\bar{o})$: color table depending on illumination and observation direction
α: Albedo or diffuse reflectivity,
$F_{S_k, \alpha_k, F_{o,k}}^{CT}(\bar{i},\bar{o})$: a k-th Cook-Torrance lobe, corresponding to a Bi-directional Reflectance Distribution Function (BRDF) that describes a glossiness of a microfacet surface,
$S_k$: weight for the k-th Cook-Torrance lobe,
$\alpha_k$: parameter for a Beckmann distribution of the k-th Cook-Torrance lobe,
$F_{0,k}$: Fresnel reflectivity for the k-th Cook-Torrance lobe, and
$\Xi(x,\bar{i},\bar{o})$: table of spatial texture images depending on illumination and observation direction,
into a term;

$$\chi(\bar{i}, \bar{o})\left(\frac{a}{\pi} + \sum_{k=1}^{3} f^{CT}_{S_k, a_k, F_{0,k}}(\bar{i}, \bar{o})\right) \quad (F1)$$

and a term $\Xi(x,\bar{i},\bar{o})$ (F2), further dividing the term (F1) into a first sub-term corresponding to the color table depending on illumination and observation direction $\chi(\bar{i},\bar{o})$ and a second sub-term corresponding to an intensity function $$\left(\frac{a}{\pi} + \sum_{k=1}^{3} f^{CT}_{S_k, a_k, F_{0,k}}(\bar{i}, \bar{o})\right),$$

and minimizing a color difference between the captured spectral reflectance data and the initial BTF by optimizing in a first optimization step the parameters of the first sub-term while the parameters of the second sub-term are kept constant, and by optimizing in a second optimization step the parameters of the second sub-term while the parameters of the first sub-term are kept constant;
rendering the object or an optical appearance of the object using the optimized BTF, wherein the object is an automobile, a vehicle part, a piece of furniture, a piece of clothing, or a packaging material, said rendering comprising applying parameters of the optimized BTF to at least one texture function to reproduce optical properties including at least a color and spatially varying appearance of the object at a given illumination level, observation angle, and/or observation direction; and
displaying the rendered object or optical appearance of the object on a display.

2. The method of claim 1, further comprising using the BTF to design a vehicle part which matches an optical appearance of part(s) adjacent to the designed vehicle part in a finished vehicle.

3. The method of claim 1, further comprising using the BTF within a car configurator.

4. The method of claim 1, further comprising using the BTF in a context of a car sales platform.

5. The method of claim 1, wherein the object is a piece of furniture.

6. The method of claim 1, wherein the object is a piece of clothing.

7. The method of claim 1, wherein the object is a packaging material.

8. A computer system comprising:
a computer unit;
a display output; and
a computer readable program with program code stored in a non-transitory computer-readable storage medium, the program code causing the computer unit, when the program is executed on the computer unit, to: (i) generate an optimized bi-directional texture function (BTF), (ii) render, using a render engine, a representation of an object using the optimized BTF, including applying parameters of the optimized BTF to at least one texture function to reproduce optical properties including at least a color and spatially varying appearance of the object at a given illumination level, observation angle, and/or observation direction and (iii) display the rendered representation of the object to an individual with the display output, wherein the BTF is generated by a method comprising at least the following steps:

measuring an initial BTF for the object using a camera-based measurement device, capturing spectral reflectance data for the object for a pre-given number of different measurement geometries using a spectrophotometer, and adapting the initial BTF to the captured spectral reflectance data by segmenting the initial BTF of Equation (1)

$$f(x, \bar{i}, \bar{o}) = \chi(\bar{i}, \bar{o})\left(\frac{a}{\pi} + \sum_{k=1}^{3} f_{S_k, a_k, F_{0,k}}^{CT}(\bar{i}, \bar{o})\right) + \Xi(x, \bar{i}, \bar{o}) \quad (1)$$

with x: surface coordinates of the sample/object, $\bar{i}, \bar{o}$: illumination and observation/viewing directions at a basecoat of the sample, $\chi(\bar{i}, \bar{o})$: color table depending on illumination and observation direction, $a$: Albedo or diffuse reflectivity, $f_{S_k, \alpha_k, F_{0,k}}^{CT}(\bar{i}, \bar{o})$: a k-th Cook-Torrance lobe, corresponding to a Bi-directional Reflectance Distribution Function (BRDF) that describes a glossiness of a microfacet surface, $S_k$: weight for the k-th Cook-Torrance lobe, $\alpha_k$: parameter for a Beckmann distribution of the k-th Cook-Torrance lobe, $F_{0,k}$: Fresnel reflectivity for the k-th Cook-Torrance lobe, and $\Xi(x, \bar{i}, \bar{o})$: table of spatial texture images depending on illumination and observation direction, into a term $$\chi(\bar{i}, \bar{o})\left(\frac{a}{\pi} + \sum_{k=1}^{3} f_{S_k, a_k, F_{0,k}}^{CT}(\bar{i}, \bar{o})\right) \quad (F1)$$

and a term $\Xi(x, \bar{i}, \bar{o})$ (F2), further dividing the term (F1) into a first sub-term corresponding to the color table depending on illumination and observation direction $\chi(\bar{i}, \bar{o})$ and a second sub-term corresponding to an intensity function $$\left(\frac{a}{\pi} + \sum_{k=1}^{3} f_{S_k, a_k, F_{0,k}}^{CT}(\bar{i}, \bar{o})\right)$$

and minimizing a color difference between the captured spectral reflectance data and the initial BTF by optimizing in a first optimization step the parameters of the first sub-term while the parameters of the second sub-term are kept constant, and by optimizing in a second optimization step the parameters of the second sub-term while the parameters of the first sub-term are kept constant, and wherein the object is an automobile, a vehicle part, a piece of furniture, a piece of clothing, or a packaging material.

9. The computer system of claim 8, wherein the render engine is a 3D render engine.

10. The computer system of claim 8, wherein the render engine is a real-time render engine.

11. The computer system of claim 8, further comprising a shader for the render engine.

12. The computer system of claim 11, wherein the shader comprises a fragment shader and a vertex shader.

13. The computer system of claim 11, further comprising an importer for the shader.

14. The computer system of claim 13, wherein the importer is configured to read the BTF from a file and translate the parameters of the BTF to the parameters of a texture function used by the shader.

* * * * *